United States Patent
Sief et al.

(10) Patent No.: US 7,592,607 B2
(45) Date of Patent: Sep. 22, 2009

(54) DEVICE FOR TREATING A FLOWING FLUID

(75) Inventors: Rolf Sief, Bielefeld (DE); Michaela Hunze, Hannover (DE); Friedhelm Krüger, Lemgo (DE)

(73) Assignee: Wedeco AG, Herford (DE)

( * ) Notice: Subject to any disclaimer, the term of this patent is extended or adjusted under 35 U.S.C. 154(b) by 232 days.

(21) Appl. No.: 11/726,337

(22) Filed: Mar. 21, 2007

(65) Prior Publication Data

US 2007/0290144 A1 Dec. 20, 2007

(30) Foreign Application Priority Data

Mar. 22, 2006 (DE) ........................ 10 2006 013 604

(51) Int. Cl.
*H01J 37/20* (2006.01)
(52) U.S. Cl. .................. 250/455.11; 210/745; 202/158; 261/94
(58) Field of Classification Search ............ 250/455.11, 250/428, 432 R, 435, 436, 438; 210/748; 202/158; 261/94, 112.1
See application file for complete search history.

(56) References Cited

U.S. PATENT DOCUMENTS

| | | | | |
|---|---|---|---|---|
| 4,501,707 A | * | 2/1985 | Buhlmann | ................... 261/94 |
| 5,614,723 A | * | 3/1997 | Oppenlander et al. | ....... 250/435 |
| 5,994,705 A | | 11/1999 | Cooke et al. | |
| 2004/0026337 A1 | * | 2/2004 | Veenstra et al. | ............. 210/748 |
| 2004/0232846 A1 | * | 11/2004 | Fischer et al. | .................. 315/94 |
| 2005/0023482 A1 | * | 2/2005 | Schulz | ................... 250/432 R |

FOREIGN PATENT DOCUMENTS

| | | |
|---|---|---|
| EP | 0 069 241 | 9/1985 |
| EP | 0 697 374 | 2/1996 |
| WO | WO 01/93995 | 12/2001 |

OTHER PUBLICATIONS

International Search Report corresponding to EP 07 00 1604 dated Mar. 12, 2007.

* cited by examiner

*Primary Examiner*—David A Vanore
*Assistant Examiner*—Michael Maskell
(74) *Attorney, Agent, or Firm*—RatnerPrestia

(57) ABSTRACT

The invention relates to a device for treating a flowing fluid, in particular water, including a housing with an inlet for supplying the fluid and an outlet for discharging the fluid, an element for generating radiation, in particular UV radiation, the radiation at least acting on a part of the flowing fluid, and a means for influencing the fluid flow within the housing wherein the means for influencing the fluid flow is configured as a module with a large number of structured metal sheets.

18 Claims, 3 Drawing Sheets

DEVICE FOR TREATING A FLOWING FLUID

This Application is a Non-Provisional Application which claims priority to German Patent Application No. DE 10 2006 013 604.7, filed Mar. 22, 2006.

The invention relates to a device for treating a flowing fluid and the use of a structured packing as a means for influencing the flow of water.

Plants for disinfecting water, in particular drinking water, are known from the prior art, in which the water flow is guided through a housing, a large number of bar-shaped UV tubes being arranged in the longitudinal direction of the housing. Germs contained in the water are killed by the UV radiation. Problems regarding the homogeneity of the water flow occur in the volume flows and diameters of these plants which are conventional in practice. There are therefore areas of more rapid and slower flow. In order to ensure reliable disinfection of the entire water flow, turbulence discs are therefore used. These are metal sheets extending transversely over the flow path and having relatively small openings, with the water flow flowing extremely turbulently through the openings. These metal sheets represent a considerable flow resistance and, as special parts, are very expensive to produce.

SUMMARY OF THE INVENTION

Accordingly, this invention provides a device for treating a flowing fluid, the manner of functioning of which is economically optimised with regard to homogeneity of the flow.

In a device for treating a flowing fluid, the device comprises a housing with an inlet for supplying the fluid and an outlet for discharging the fluid, an element for generating radiation, the radiation at least acting on a part of the flowing fluid and a means for influencing the fluid flow within the housing, wherein the means for influencing the fluid flow is configured as a module with a large number of structured metal sheets.

DETAILED DESCRIPTION OF THE INVENTION

Figure 1:
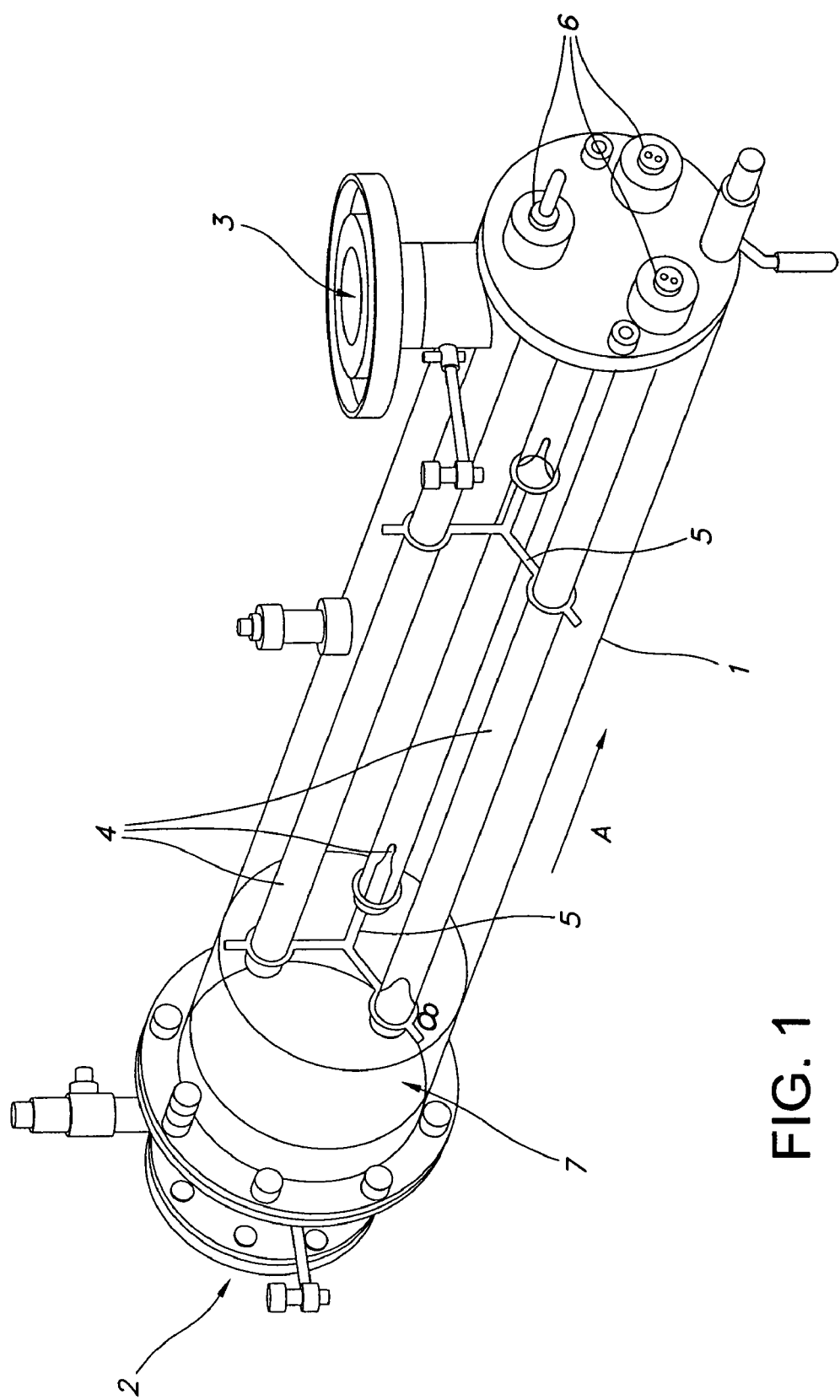
FIG. 1 shows a three-dimensional view of a device according to the invention.

The invention provides a device for treating a flowing fluid, the manner of functioning of which is economically optimised with regard to homogeneity of the flow. The device includes a housing with an inlet for supplying the fluid and an outlet for discharging the fluid, an element for generating radiation, the radiation at least acting on a part of the flowing fluid and a means for influencing the fluid flow within the housing. The means for influencing the fluid flow is configured as a module with a large number of structured metal sheets. The homogenisation of the fluid flow can easily be achieved by the large number of structured metal sheets, which are configured as a module. The metal sheets are preferably arranged substantially parallel to one another, in this case, a main flow direction of the fluid extending substantially parallel to the metal sheets. This achieves a very good evening out of the fluid flow with particularly low flow resistance of the means for influencing the fluid flow. An enveloping outer shape of the module is advantageously substantially cylindrical for simple integration into current plants, in particular tubular housings.

In the interest of simple manufacturing, the structured metal sheets can be configured as expanded metal sheets. Good results are achieved in the evening out of the flow taking into account a small flow resistance when the expanded metal sheets substantially have rhombic openings. The expanded metal sheets preferably have webs, which are wound relative to a main plane of the metal sheets. As a result, a mixing of various flow areas of the fluid can be easily achieved with a low pressure drop.

The metal sheets advantageously bring about a separation of the flow of a main flow of the fluid into a plurality of sub-flows, deflection thereof and final combination. A smoothing out of the fluid flow is thereby achieved, without an unnecessarily large number of local turbulences being introduced into the fluid flow.

The device is particularly advantageously a UV disinfection plant for treating drinking water. In this case, good smoothing out of the fluid flow is particularly important to achieve complete disinfection in a controlled manner. The drinking water flow in a normal operating state is advantageously at least about 10 cubic meters per hour, the entire pressure drop of the drinking water flow over the device being less than 100 mbar.

In the interest of simple production, the housing is substantially cylindrical, and the inlet and the outlet are arranged on opposing end regions of the cylinder. Alternatively, the housing shape may be any desired shape with the means for influencing the flow regularly being arranged between the inlet and the elements for producing radiation.

The element for producing radiation is expediently a substantially bar-shaped UV tube, which is substantially oriented along a main flow direction of the fluid. As a result, an adequately high dose of radiation can be produced with a relatively small number of radiation-generating elements. Alternatively, the UV tubes may also be arranged, depending on the housing design, vertically, or at another angle with respect to the main flow direction of the fluid.

In one particular embodiment, the means for influencing the fluid flow comprise a structured packing for absorption columns and/or extraction columns and/or rectifier columns. Structured packings of this type are used for purposes other than the present purposes to a large extent in industrial plants, in particular distillation plants. Tests have shown that elements of this type are particularly suitable, without any changes or with only a few changes, for homogenising a fluid flow.

In particular for current systems for drinking water disinfection, the packings preferably have a surface of about 100 $m^2$ to about 500 $m^2$ per cubic meter volume. This surface can be between about 100 $m^2$ and about 200 $m^2$ per cubic meter. It has been shown that a good compromise is present in this case with regard to the unifying of the flow and the pressure drop resulting therefrom. In addition, it can be achieved with the given structure density that at least broad parts of the surfaces of the packing are reached by the disinfecting radiation. Consequently it is ensured that no algae formation or other accumulation of germs can be produced on the packings despite the relatively large surface, even in the case of permanent operation.

The structured metal sheets in general consist of a non-corrosive material, in particular high-grade steel suitable for drinking water. Advantageously, at least the surface of the metal sheets may comprise a germicidal material, in particular silver. As a result, advantages are realised, in particular in use in the drinking water sector.

A structured packing for absorption columns and/or extraction columns and/or rectifier columns are used as means for influencing the flow of drinking water in a device for disinfecting the drinking water by means of UV radiation. As a result, the mode of functioning of the plant is improved at low cost, good smoothing out of the drinking water with a low pressure drop, in particular, being provided by the flow-influencing means. Packings of this type are known from the prior art for use in systems, in which various phases are present, which should be in contact over a surface which is as large as possible. These packings are therefore not known for being suitable for the homogenisation of a fluid flow. The tests on which the invention is based have shown the surprising effect that the combination of such column packings with drinking water disinfection plants produces a significant improvement of the function of the disinfection plants at low cost.

Structured packings, which correspond to a flow-influencing means in the context of the present invention are described in detail in particular in U.S. Pat. No. 4,501,707, which is incorporated by reference herein, with regard to their shape and their production. This document is therefore expressly included in the scope of the disclosure of the present invention.

Further advantages and features of the invention emerge from the following described embodiment and from the dependent claims. An embodiment of a device according to the invention will be described below and explained in more detail with the aid of the accompanying drawings.

FIG. 1 shows a device for disinfecting drinking water by means of UV radiation. The device comprises a tubular, substantially cylindrical housing 1 which has an inlet 2 at one end region and an outlet 3 at the opposing end region. Three elongated UV tubes 4 are arranged parallel to one another inside the housing 1 and oriented in the longitudinal direction of the housing 1, the tubes being positioned and held via a thin web-like holding means 5, substantially floating in the housing 1. The tubes 4 are contacted by electric connections for voltage supply via feed-throughs 6 of the housing 1. The apparatus for the homogenisation of the drinking water flow 7 is arranged between the inlet region 2 and the closest end of the tubes 4 in the flow direction of the drinking water. This means is shown purely schematically in FIG. 1 as a cylindrical space section between the inlet region 2 and the beginning of the tubes 4.

Figure 2:
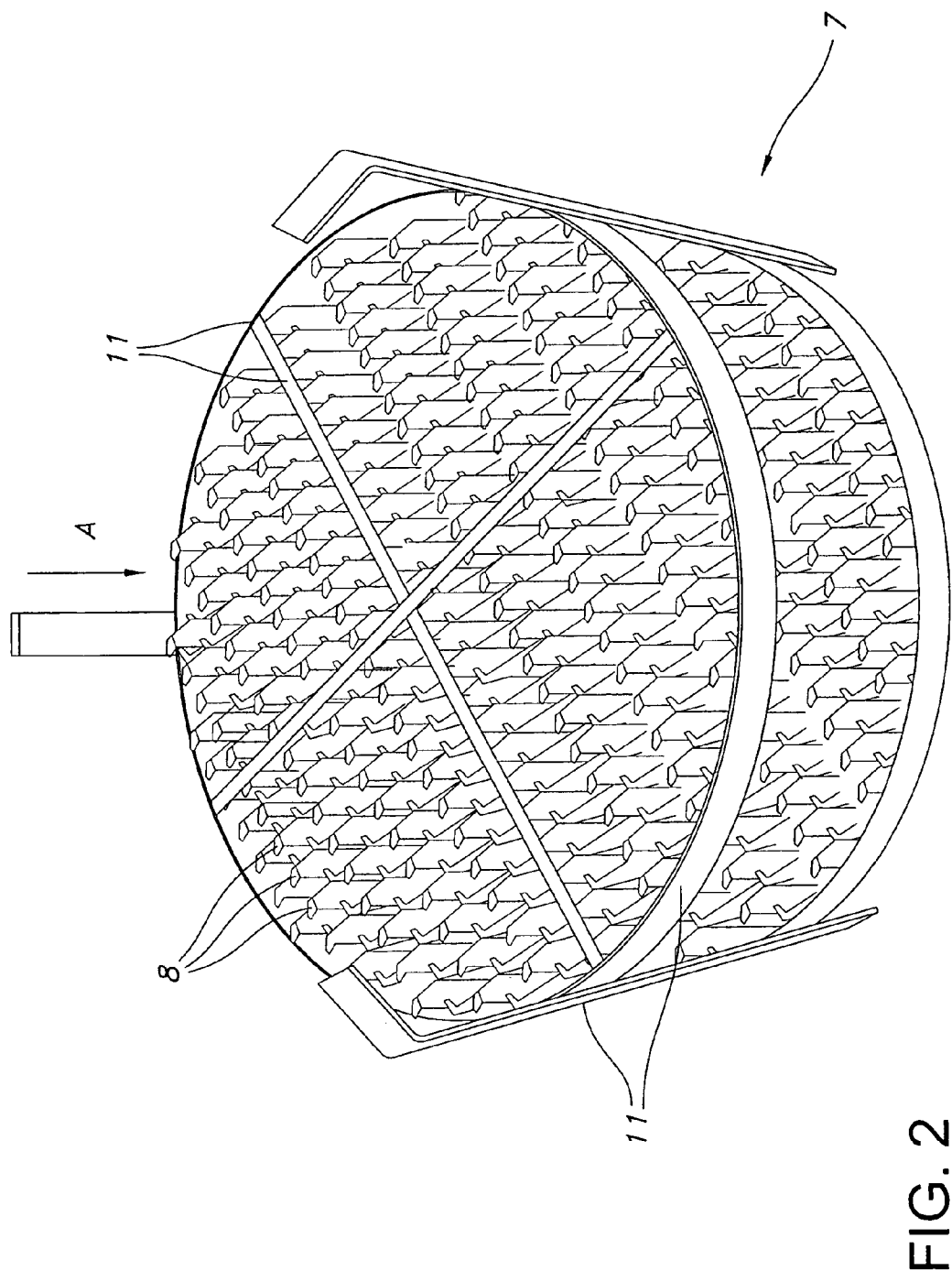
FIG. 2 shows a schematic photographic view of a means for influencing a fluid flow according to the present invention.

The apparatus 7 configured as a module is a structured packing, which is otherwise used in rectifier columns. A packing 7 of this type is shown in FIG. 2. The packing 7 has a substantially cylindrically enveloping frame portion, the axis of symmetry of the cylinder coinciding with the axis of symmetry of the housing 1. The apparatus 7 comprises a number, about two dozen, structured metal sheets 8, which are arranged parallel to one another in the manner of a stack. The levels of the structured metal sheets 8 are directed, in this case, substantially parallel to the main flow direction of the drinking water. The packing 7 also comprises sheet metal strips 11 forming with the cylindrical frame portion a support frame to hold and position the packing.

Figure 3:
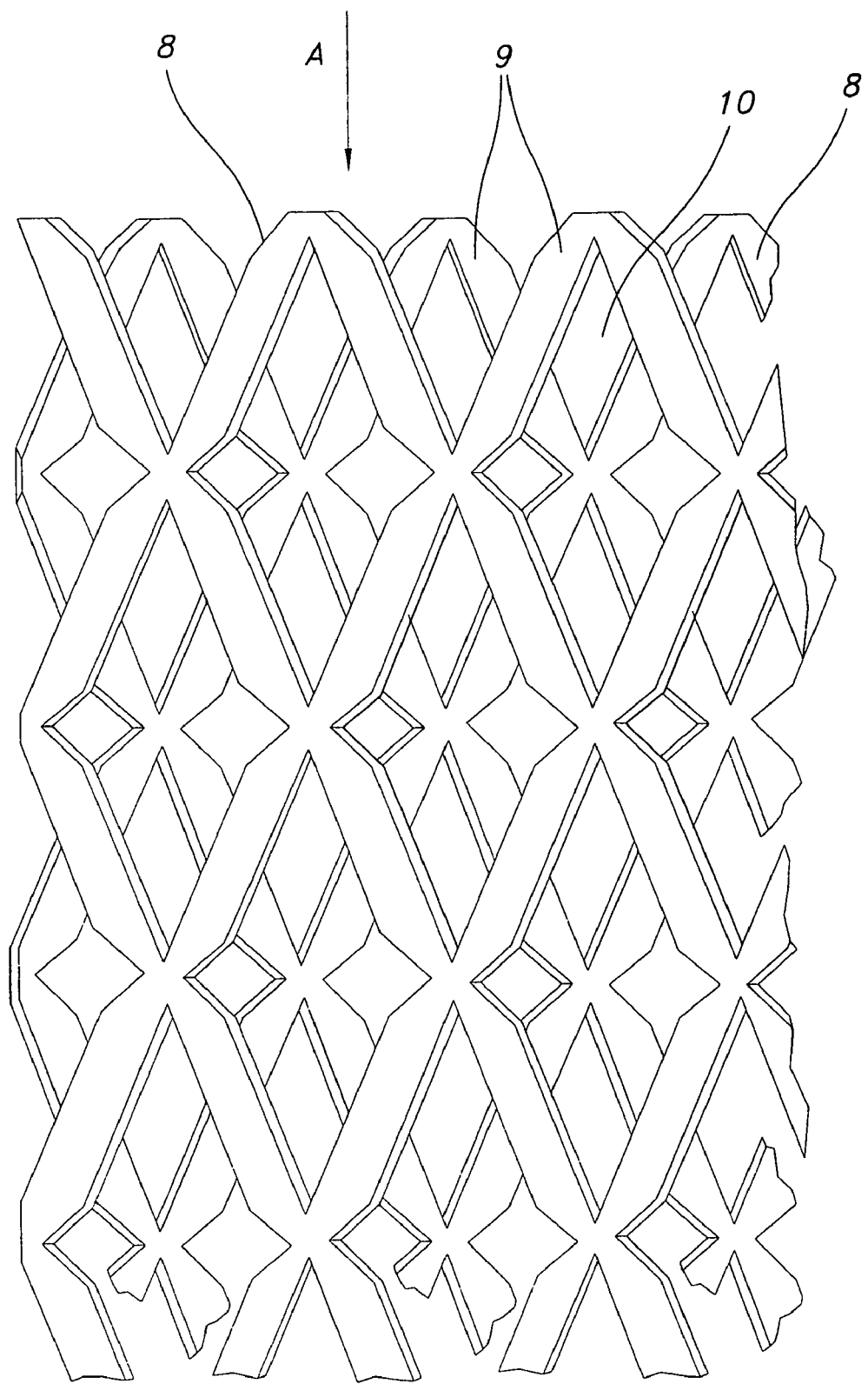
FIG. 3 shows a schematically represented cut-out from a means for influencing a fluid flow according to FIG. 2.

Each of the metal sheets 8 is an expanded metal sheet part (see FIG. 3). An originally simple metal sheet is perforated by stamping and formed by expansion into the structured metal sheet parts according to FIG. 3. FIG. 3 shows two metal sheets 8 resting on one another, which have the same repeated structure and a defined offset with respect to one another. Each of the metal sheets 8 comprises a grid made of webs or lamellae 9, star-like or rhombus-like openings 10 remaining between the webs 9. The individual webs 9 or parts of them are wound, in order to further optimise the overall structure. The flow direction of the drinking water corresponds to the arrow A according to FIG. 3. Reference is expressly made to the document EP 0 069 241 B1 for the precise configuration of the sheet metal parts and packings and conventional modifications.

The preferred structured packing for rectifier columns, as also shown in FIG. 2, is a product of the series "Rombopak 4M" from Kühni AG, Gewerbestraβe 28, CH-4123 Allschwil 2, Switzerland (Internet: www.kuhni.ch). Basically, all the Rombopak products from Kühni AG have proven very suitable for flow unification in drinking water disinfection plants. The product "Rombopak 4M" is particularly suitable with regard to the structural density as its still adequately high structural density, but still relatively small structural density or inner surface in comparison to the other products, allows an adequate portion of UV radiation onto the individual surfaces of the structured metal sheets 8, so the formation of germs on the surfaces is avoided even in the case of a long operating period.

The invention functions as follows:

The drinking water flowing in according to the arrow A in FIG. 3 or in the direction of the cylinder axis of the housing 1 initially has, in the inlet region of the housing 1 a very non-homogeneous flow distribution, with fast-flowing and slow-flowing regions existing. The drinking water flow is divided by the individual webs 9 into many individual flow paths, which are then deflected when running through the packing. Inside and at the end of the packing, these divided and spatially offset sub-flows are combined again. The drinking water flow will thus be very well unified over the entire cross-section of the housing 1, without an unnecessarily large number of turbulences being generated. Tests have shown that in the case of typically smaller to medium-sized plants, which have volume flows of typically 15 to 30 cubic meters per hour during normal operation, good homogenisation of the flow was achieved, in which a total pressure drop over the device was in the region of only 50 mbar.

The invention claimed is:

1. Device for treating a flowing fluid, comprising a housing with an inlet for supplying the fluid and an outlet for discharging the fluid, an element for generating radiation, the radiation at least acting on a part of the flowing fluid and a means for influencing the fluid flow within the housing wherein the means for influencing the fluid flow is configured as a module with a large number of structured metal sheets,
   wherein the device is an UV disinfecting plant for treating drinking water, and
   wherein the drinking water flow in a normal operating state is at least about 10 cubic meters per hour, the entire pressure drop of the drinking water flow over the device being less than 100 mbar.

2. Device according to claim 1, wherein the metal sheets are arranged substantially parallel to one another, a main flow direction of the fluid running substantially parallel to the metal sheets.

3. Device according to claim 1, wherein an enveloping outer shape of the module is substantially cylindrical.

4. Device according to claim 1, wherein the structured metal sheets are configured as expanded metal sheets.

5. Device according to claim 4, wherein the expanded metal sheets substantially have rhombic openings.

6. Device according to claim 4, wherein the expanded metal sheets have webs, which are wound relative to as main plane of the metal sheets.

7. Device according to claim 1 wherein the metal sheets bring about a separation of flow of a main flow of the fluid in a plurality of sub-flows, the deflection and final combination thereof.

8. Device according to claim 1, wherein the device is an UV disinfecting plant for treating drinking water.

9. Device according to claim 1, wherein the housing is essentially cylindrical, the inlet and the outlet being arranged on opposing end regions of the housing.

10. Device according to claim 1, wherein the element for generating radiation is a substantially bar-shaped UV tube, which is substantially oriented along a main flow direction of the fluid.

11. Device according to claim 1, wherein the means for influencing the fluid flow comprises a structured packing for absorption columns, extraction columns or rectifier columns.

12. Device according to claim 11, wherein the packing has a surface of about 100 square meters to about 500 square meters per cubic meter volume.

13. Device according to claim 12, wherein the surface is between about 100 square meters and about 200 square meters per cubic meter volume.

14. Device according to claim 1, wherein the structured metal sheets consist of a non-corrosive material.

15. Device for treating a flowing fluid, comprising a housing with an inlet for supplying the fluid and an outlet for discharging the fluid, an element for generating radiation, the radiation at least acting on a part of the flowing fluid and a means for influencing the fluid flow within the housing wherein the means for influencing the fluid flow is configured as a module with a large number of structured metal sheets, wherein the structured metal sheets consist of a non-corrosive material, wherein at least the surface of the metal sheets comprises a germicidal material.

16. Device according to claim 1, wherein the element generates UV radiation.

17. Device according to claim 14, wherein the non-corrosive material is a high-grade steel suitable for drinking water.

18. Device according to claim 15, wherein the germicidal material is silver.

* * * * *